United States Patent
Han

(10) Patent No.: US 10,398,278 B2
(45) Date of Patent: Sep. 3, 2019

(54) ELECTRONIC DEVICE AND OPERATION METHOD THEREFOR

(71) Applicant: SAMSUNG ELECTRONICS CO., LTD., Suwon-si, Gyeonggi-do (KR)

(72) Inventor: Jonghyun Han, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 284 days.

(21) Appl. No.: 15/357,042

(22) Filed: Nov. 21, 2016

(65) Prior Publication Data

US 2017/0164803 A1    Jun. 15, 2017

(30) Foreign Application Priority Data

Dec. 14, 2015 (KR) .................. 10-2015-0178327

(51) Int. Cl.

| | | |
|---|---|---|
| *G05B 19/04* | (2006.01) | |
| *G05B 19/18* | (2006.01) | |
| *A47L 11/40* | (2006.01) | |
| *B25J 11/00* | (2006.01) | |
| *B25J 13/00* | (2006.01) | |
| *H04B 1/3827* | (2015.01) | |
| *A47L 9/28* | (2006.01) | |
| *H04W 4/80* | (2018.01) | |

(52) U.S. Cl.
CPC ......... *A47L 11/4011* (2013.01); *A47L 9/2805* (2013.01); *A47L 9/2842* (2013.01); *A47L 9/2852* (2013.01); *B25J 11/0085* (2013.01); *B25J 13/006* (2013.01); *H04B 1/3833* (2013.01); *A47L 2201/04* (2013.01); *A47L 2201/06* (2013.01); *H04W 4/80* (2018.02); *Y10S 901/01* (2013.01)

(58) Field of Classification Search
CPC ............. A47L 11/4011; A47L 2201/04; A47L 2201/06; A47L 9/2805; A47L 9/2842; A47L 9/2852; B25J 11/0085; B25J 13/006; H04B 1/3833; H04W 4/80; Y10S 901/01

See application file for complete search history.

(56) References Cited

U.S. PATENT DOCUMENTS

| | | | |
|---|---|---|---|
| 2008/0134457 A1 | 6/2008 | Morse et al. | |
| 2014/0207282 A1* | 7/2014 | Angle | H04L 12/282 700/257 |
| 2015/0297052 A1* | 10/2015 | Eidmohammadi | G05D 1/0225 134/18 |
| 2017/0215670 A1* | 8/2017 | Heo | G01J 1/00 |
| 2017/0215672 A1* | 8/2017 | Watanabe | A47L 9/28 |
| 2018/0242806 A1* | 8/2018 | Haegermarck | A47L 9/2852 |

FOREIGN PATENT DOCUMENTS

| | | |
|---|---|---|
| KR | 10-2013-0141716 | 12/2013 |
| KR | 10-2015-0026529 | 3/2015 |
| KR | 10-2015-0028152 | 3/2015 |

* cited by examiner

*Primary Examiner* — Harry Y Oh
(74) *Attorney, Agent, or Firm* — Nixon & Vanderhye P.C.

(57) ABSTRACT

The disclosure relates generally to an electronic device and an operation method therefor. The operation method for an electronic device may include: determining whether a cleaning function is activated; searching for at least one external device; and performing a cleaning function according to a result of the searching.

14 Claims, 14 Drawing Sheets

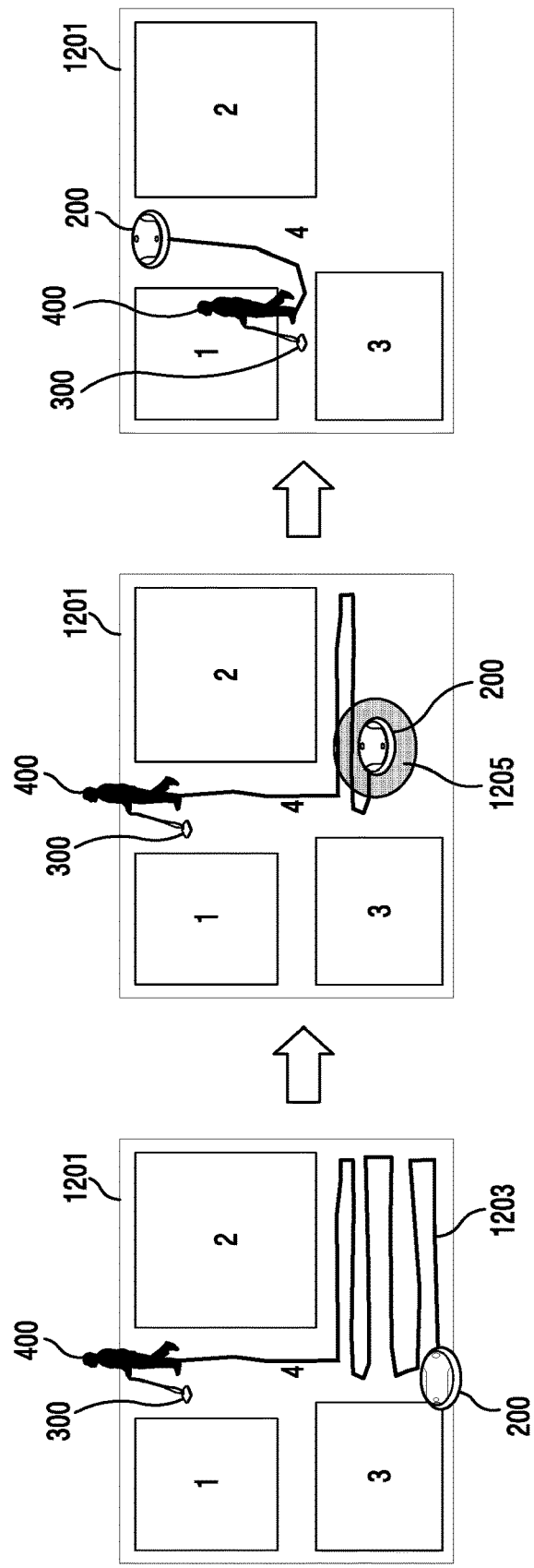

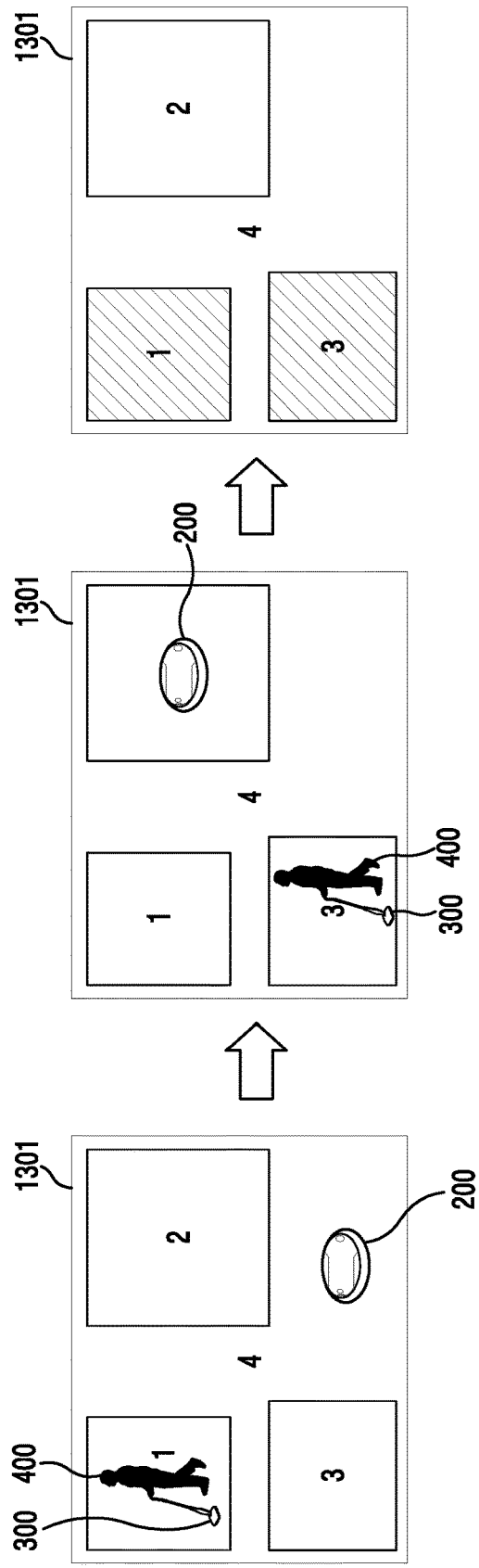

ELECTRONIC DEVICE AND OPERATION METHOD THEREFOR

CROSS-REFERENCE TO RELATED APPLICATION

This application is based on and claims priority under 35 U.S.C. § 119 to Korean Application Serial No. 10-2015-0178327, which was filed in the Korean Intellectual Property Office on Dec. 14, 2015, the content of which is incorporated by reference herein in its entirety.

TECHNICAL FIELD

The present disclosure relates generally to an electronic device for wireless cleaning and an operation method therefor.

BACKGROUND

An autonomous mobile robot is a device which performs a predetermined mission while moving around in an arbitrary region without a user's manipulation. The robot may autonomously move around a relatively large area and the autonomous moving around may be implemented in various methods. In particular, a robot cleaner (e.g., a wireless cleaner) is an electronic device which can perform cleaning while moving around in an area to be cleaned without the user's manipulation. Since the robot cleaner moves around by itself to clean a random space of an area to be cleaned, sometimes a cleaning operation is not performed by the presence of an obstacle and the state of a bottom surface. Accordingly, in recent years, various technologies have been developed to improve a cleaning efficiency for all areas to be cleaned.

Since the electronic device described above may perform a cleaning operation through only its own control, it is difficult to interwork with an external device to check the cleaning environment so that the cleaning operation may not be efficiently performed.

SUMMARY

To address the above problems, various example embodiments of the present disclosure provide an electronic device and an operation method therefor, which can check the cleaning environment by interworking with an external device so as to improve cleaning efficiency.

A method for operating an electronic device according to an example embodiment of the present disclosure may include: checking whether a cleaning function is activated; searching for at least one external device; and performing a cleaning function based on a result of the searching.

An electronic device according to an example embodiment of the present disclosure may include a communication unit comprising communication circuitry configured to communicate with at least one external device; and a controller configured to check whether a cleaning function is activated, and to perform the cleaning function based on a result of searching for the at least one external device.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein:

FIGS. 12A, 12B and 12C are diagrams illustrating an example method for performing detailed cleaning by an electronic device according to an example embodiment of the present disclosure;

FIGS. 13A, 13B and 13C are diagrams illustrating an example method for performing division cleaning by an electronic device according to an example embodiment of the present disclosure.

DETAILED DESCRIPTION

Figure 1:
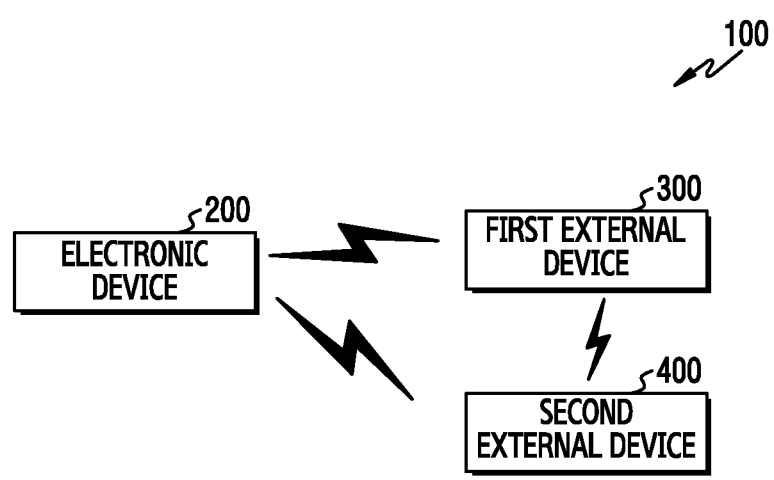
FIG. 1 is a diagram illustrating an example system for an operation of an electronic device according to an example embodiment of the present disclosure.

Hereinafter, example embodiments of the present disclosure will be described in greater detail with reference to the accompanying drawings. It should be noted that, if possible, identical elements are designated by identical reference signs in the drawings. The detailed description of known functions and structures may be omitted to avoid an unclearness of the subject matter of the present disclosure.

FIG. 1 is a diagram illustrating an example system for an operation of an electronic device according to an example embodiment of the present disclosure.

Referring to FIG. 1, a system 100 according to an example embodiment of the present disclosure may include an electronic device 200, a first external device 300, and a second external device 400.

The electronic device 200 may include, for example, a wireless cleaner that can clean a space where the electronic device is located. A wireless cleaner may, for example, be any wireless cleaning device, such as, for example, and without limitation, a robotic vacuum cleaner. The electronic device 200 may wirelessly communicate with at least one of the first external device 300 and the second external device 400. When a signal for activating an environment-based cleaning function is received from a user, the electronic device 200 may activate an environment-based cleaning function. The electronic device 200 may search for an external device, and select one of a first cleaning function, a second cleaning function, and a third cleaning function based on a result of the search. The electronic device 200 may clean a neighboring space based on the selected cleaning function.

In a state where the environment-based cleaning function is activated, the electronic device 200 may perform the first cleaning function if the first external device 300 and second external device 400 are detected. The first cleaning function may be performed in a state where the user manually performs cleaning using the first external device 300 while possessing the second external device 400. The electronic device 200 may perform, for example, one of a rough cleaning function, a detailed cleaning function, and a division cleaning function based on the signal received from the first external device 300. Each cleaning function included in the first cleaning function will be described in greater detail below.

In a state where the environment-based cleaning function is activated, the electronic device 200 may perform a second cleaning function if the second external device 400 is detected. In a state where the environment-based cleaning function is activated, the electronic device 200 may perform a third cleaning function if the first external device 300 and second external device 400 are not detected. The second cleaning function and third cleaning function may include a function for performing cleaning after changing the cleaning function being performed to a noise-free function or a pause function according to the user's operation.

The first external device 300 may include a cleaning device which is functionally connected (for example, wirelessly connected) to the electronic device 200 to perform the cleaning as being complementary to the electronic device 200. The first external device 300 may include a cleaning device that the user directly operates. The second external device 400 may be a portable terminal, for example, and without limitation, a smartphone or a wearable device which is functionally connected (for example, wirelessly connected) to the electronic device 200 to provide status information of the user to the electronic device 200.

Figure 2:
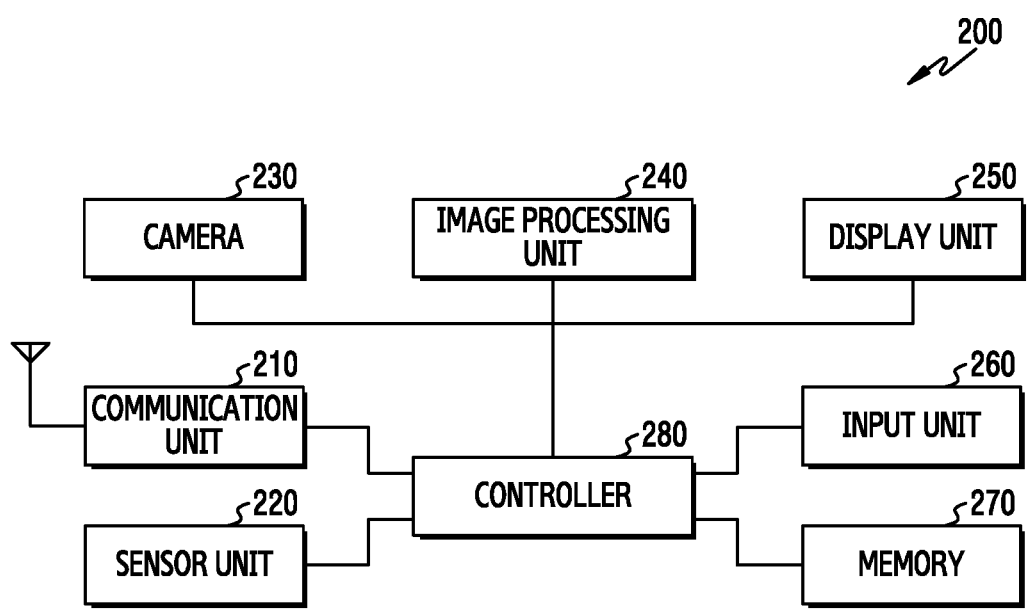
FIG. 2 is a block diagram illustrating an example configuration of an electronic device according to an example embodiment of the present disclosure.

FIG. 2 is a block diagram illustrating an example configuration of an electronic device according to an example embodiment of the present disclosure.

Referring to FIG. 2, an electronic device 200 according to an example embodiment of the present disclosure may include a communication unit (e.g., including communication circuitry) 210, a sensor unit 220, a camera 230, an image processing unit (e.g., including image processing circuitry) 240, a display unit 250, an input unit (e.g., including input circuitry) 260, a memory 270, and a controller (e.g., including processing circuitry) 280.

The communication unit 210 may include various communication circuitry configured to communicate with the first external device 300 that includes a cleaning device which may, for example, be directly controlled by the user and the second external device 400 that includes a portable electronic device such as a smart phone, a tablet, a wearable device, or the like, but is not limited thereto. In this example, the communication unit 210 may communicate with an external device through various methods. The communication unit 210 may perform at least one of wireless communication and wired communication. The communication unit 210 may include Long Term Evolution (LTE), Wideband Code Division Multiple Access (WCDMA), Global System for Mobile Communications (GSM), Wi-Fi, Bluetooth, Near Field Communications (NFC), Bluetooth Low Energy (BLE), and Infrared Ray (IR).

The sensor unit 220 may include various sensing circuitry and/or sensors, or the like, which may be configured to, for example, measure a physical quantity or detect an operation state of the electronic device 200, and may convert the measured information or detected information into an electrical signal. The sensor unit 220 may include various sensors, such as, for example, and without limitation, at least one of a gesture sensor, a gyro sensor, an atmospheric pressure sensor, a magnetic sensor, an accelerometer sensor, a proximity sensor, a thermal sensor, a pressure sensor, a biometric sensor, a light sensor, and a dust sensor. The sensor unit 220 may include a control circuit for controlling at least one sensor. The sensor unit 220 may provide sensing information sensed by the at least one sensor to the controller 280.

The camera 230 is placed at a specific location on the electronic device 200 so as to acquire image data for a subject. To this end, the camera 230 may receive an optical signal. The camera 230 may generate image data from the optical signal. The camera 230 may include a camera sensor and a signal conversion unit. The camera sensor may be included in the sensor unit 220. The camera sensor may convert the optical signal into an electric image signal. The signal conversion unit may convert an analog image signal to a digital image data.

The image processing unit 240 may include various circuitry configured to process the image data. The image processing unit 240 may process the image data in units of frame, and correspond the same to the characteristics and size of the display unit 250 and then output the same. For example, the image processing unit 240 may compress the image data using a predetermined method, or recover the compressed image data to original image data. The image processing unit 240 may provide the image data processed in units of frames to the controller 280.

The display unit 250 may display the display data according to the operation of the electronic device 200. The display unit 250 may include a Liquid Crystal Display (LCD), a Light Emitting Diode (LED) display, an Organic LED (OLED) display, a Micro Electro Mechanical System (MEMS) display, and an electronic paper display, or the like, but is not limited thereto. The input unit 250 may include various input circuitry, such as, for example, and without limitation, a touch screen while being coupled with the input unit 260.

The input unit 260 may include various input circuitry to generate input data in response to a user input of the electronic device 200. The input unit 260 may include at least one input means. The input unit 260 may include various input circuitry, such as, for example, and without limitation, a key pad, a dome switch, a touch panel, a jog & shuttle, a sensor, a touch key, and a menu button.

The memory 270 may store map data on a space where the electronic device 200 is located. The map data may be transmitted from a specific server and then stored. The memory 270 may store operation programs of the electronic device 200. To this end, the memory 270 may include, for example, an internal memory or an external memory. The internal memory 270 may include, for example, at least one of a volatile memory (for example, a Dynamic Random Access Memory (DRAM), a Static RAM (SRAM), a Synchronous Dynamic RAM (SDRAM), or the like) and a non-volatile memory (for example, a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, or a Solid State Drive (SSD)). The external memory 234A may further include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), or a memory stick, etc. The external memory can be functionally and/or physically connected to the electronic device through various interfaces.

When a signal for activating an environment-based cleaning function is received from the input unit 260, the controller 280 may include various processing circuitry, such as, for example, and without limitation, a processor, dedicated processor, field programmable gate array, application specific circuitry, or the like, configured to activate the environment-based cleaning function. In a state where the environment-based cleaning function is activated, the controller 280 may perform the first cleaning function if the first external device 300 and second external device 400 are detected. The controller 280 may perform one of a rough cleaning function, a detailed cleaning function, and a division cleaning function based on a signal received from the first external device 300 through wireless communication.

When the signal received from the first external device 300 may, for example, refer to a signal for the rough cleaning, the controller 280 may perform the cleaning using a predetermined cleaning function. In this example, the predetermined cleaning function may be set to the rate, number of revolutions, and the like of a normal cleaning function. The controller 280 may detect a specific area, such as a corner, threshold, etc., which is difficult for the electronic device 200 to clean, by analyzing the image data, which is acquired by the camera 230 in real time or periodically, while performing the cleaning. The controller 280 may detect a specific area where an amount of dust sensed by a dust sensor of the sensor unit 220 is greater than or equal to a threshold value, while performing the cleaning. The controller 280 may transmit the location information on the detected specific area to at least one of the first external device 300 and the second external device 400. The controller 280 may check the current location detected as the specific area, using map data stored in the memory 270, and transmit the same to the external device. When it is confirmed that an external device enters a specific area, the controller 280 may move to another area to perform the cleaning. The controller 280 may check that the external device has entered the specific area through the wireless communication with the external device. The controller 280 may check that the external device is adjacent to the electronic device 200 based on sensing information received by a sensor of the sensor unit 220, such as a proximity sensor and the like, and may check that the external device has entered the specific area on the basis thereof.

When a signal received from the external device 300 is a signal for the detailed cleaning, the controller 280 may check a moving path of at least one of the first external device 300 or the second external device 400. The controller 280 may check a moving path of the external device through wireless communication with the external device and map data. The controller 280 may analyze the image data, which is acquired by the camera 230 in real time or periodically, while moving along a moving path so as to detect a specific area where the cleaning is not completely done. The controller 280 may detect, by the dust sensor of the sensor unit 220, a specific area where the cleaning is not completely done while moving along the moving path. The controller 280 may clean the detected specific area.

When a signal received from the first external device 300 is a signal for the division cleaning, the controller 280 may call the map data stored in the memory 270. The controller 280 may check the moving path and current location of the external device. The controller 280 may check the moving path and current location of the external device through wireless communication with the external device and map data. The controller 280 may check an area from the map data, in which the area does not overlap with the moving path and current location of the external device. The controller 280 may make a control so as to move to the checked area and perform the cleaning. The controller 280 may convert the cleaning function into a noise-free function or a pause function while performing the first cleaning function, based on the sensing information of the second external device 400.

In a state where the environment-based cleaning function is activated, the controller 280 may perform a second cleaning function if, for example, the second external device 400 is detected. The controller 280 may receive the sensing information from the second external device 400 in real time or periodically while performing the cleaning. The controller 280 may check the user's action from the sensing information. The user's operation may refer to various actions such as a sleep state, a movement state, a busy state for a phone call, or a media data watching or listening state. The controller 280 may change the cleaning function being performed to a noise-free function or a pause function according to the user's action. In addition, the controller 280 may change the rate and number of revolutions of a predetermined cleaning function according to the user's operation.

In a state where the environment-based cleaning function is activated, the controller 280 may perform a third cleaning function if, for example, the first external device 300 and second external device 400 are not detected. The controller 280 may sense, from various sensors included in the sensor unit 220, the sensing information in real time or periodically while performing the cleaning. The controller 280 may check the user's action from the sensing information. The user's action may refer to various operations such as a sleep state, a movement state, a busy state for a phone call, or an appreciation state for media data. The controller 200 may change the cleaning function being performed to a noise-free function or a pause function according to the user's action. In addition, the controller 280 may change the rate and number of revolutions of a predetermined cleaning function according to the user's action.

According to an example embodiment, the electronic device 200 according to the present disclosure may include a communication unit 210 including various communication circuitry configured to communicate with at least one external device, and a controller 280 including various processing circuitry configured to check whether the cleaning function is activated, and perform the cleaning function according to a result of searching for the at least one external device. When the first external device 300 and second external device 400 are detected, the controller 280 may perform the first cleaning function. The electronic device 280 may perform one of a rough cleaning function, a detailed cleaning function, and a division cleaning function based on a signal received from the first external device 300. The first external device 300 and second external device 400 may be a cleaning device and a wearable device respectively, and the electronic device 200 may be a wireless cleaner.

The rough cleaning function may be performed by performing the cleaning, transmitting the location information on a specific area which is detected during the cleaning to at least one external device, and when the at least one external device enters a specific area, moving to another region and then performing the cleaning. The detailed cleaning function may be performed by moving along a moving path of the at least one external device, and when a specific area is detected from the moving path, performing the cleaning for the specific area. The division cleaning function may be performed by checking a location where the location does not overlap with at least one of the moving path and current location of the at least one external device, and moving to the checked location and performing the cleaning.

When the second external device 400 is detected, the controller 280 may perform a second cleaning function. The controller 280 may perform the cleaning using a predetermined cleaning function, and change the cleaning function or maintain the cleaning function depending on a result of the analysis of the sensed information received from the second external device and then perform the cleaning.

The electronic device 200 may include a sensor unit 220 including at least one sensor, and when at least one external device is not detected, the controller 280 may activate a sensor, set a cleaning function according to the sensing information sensed by the sensor, and perform the cleaning.

Figure 3:
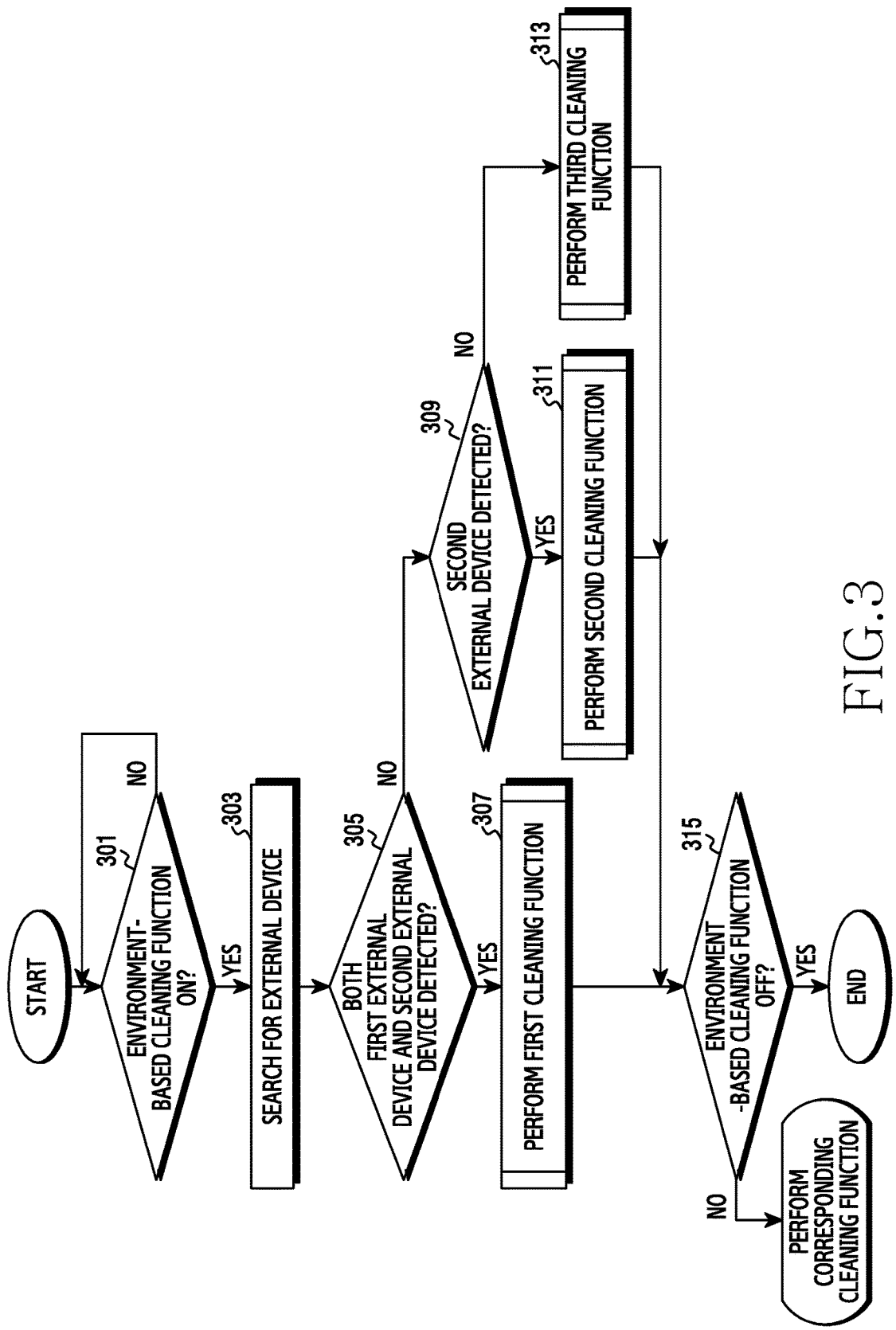
FIG. 3 is a flowchart illustrating an example operation method for an electronic device according to an example embodiment of the present disclosure.

FIG. 3 is a flowchart illustrating an example operation method for an electronic device according to an embodiment of the present disclosure.

Referring to FIG. 3, in operation 301, the electronic device 200 may check whether an environment-based cleaning function is activated (ON). The environment-based cleaning function may be activated by a signal input by the input unit 260 of the electronic device 200. When the environment-based cleaning function is not activated in operation 301, a signal for activating the environment-based cleaning function may be in a stand-by state. In operation 301, when the environment-based cleaning function is activated, the electronic device 200 may proceed to perform operation 303. In operation 303, the electronic device 200 may search for at least one external device (for example, the first external device 300 and second external device 400), and proceed to perform operation 305. To this end, the electronic device 200 may perform wireless communication through the BLE, Bluetooth, RFID, and the like.

In operation 305, when both the first external device 300 and the second external device 400 are detected, the electronic device 200 may proceed to perform operation 307. In operation 307, the electronic device 200 may perform a first cleaning function, and proceed to perform operation 315. The operation of the electronic device 200 that performs the first cleaning function will be described in greater detail with reference to FIG. 4 to FIG. 7. In operation 305, when the first external device 300 and the second external device 400 are not detected, the electronic device 200 may proceed to perform operation 309.

In operation 309, when the second external device 400 is detected, the electronic device 200 may proceed to perform operation 311. In operation 311, the electronic device 200 may perform a second cleaning function, and proceed to perform operation 315. The operation of the electronic device 200 that performs a second cleaning function will be described in detail with reference to FIG. 8 to FIG. 9. In operation 309, when the second electronic device 400 is not detected, that is, neither of the first external device 300 and second external device 400 is detected, the electronic device 200 may proceed to perform operation 313. In operation 313, the electronic device 200 may perform a third cleaning function, and proceed to perform operation 315. The operation of the electronic device 200 that performs the third cleaning function will be described in detail with reference to FIG. 10.

In operation 315, the electronic device 200 may check whether the environment-based cleaning function is deactivated (OFF). In operation 315, when the environment-based cleaning function is deactivated, the electronic device 200 may terminate the process. In operation 315, when the environment-based cleaning function is not deactivated, the electronic device 200 may perform the corresponding cleaning function. The corresponding cleaning function may be one of the first cleaning function, the second cleaning function, the third cleaning function which are being executed prior to perform the operation 315.

Figure 4:
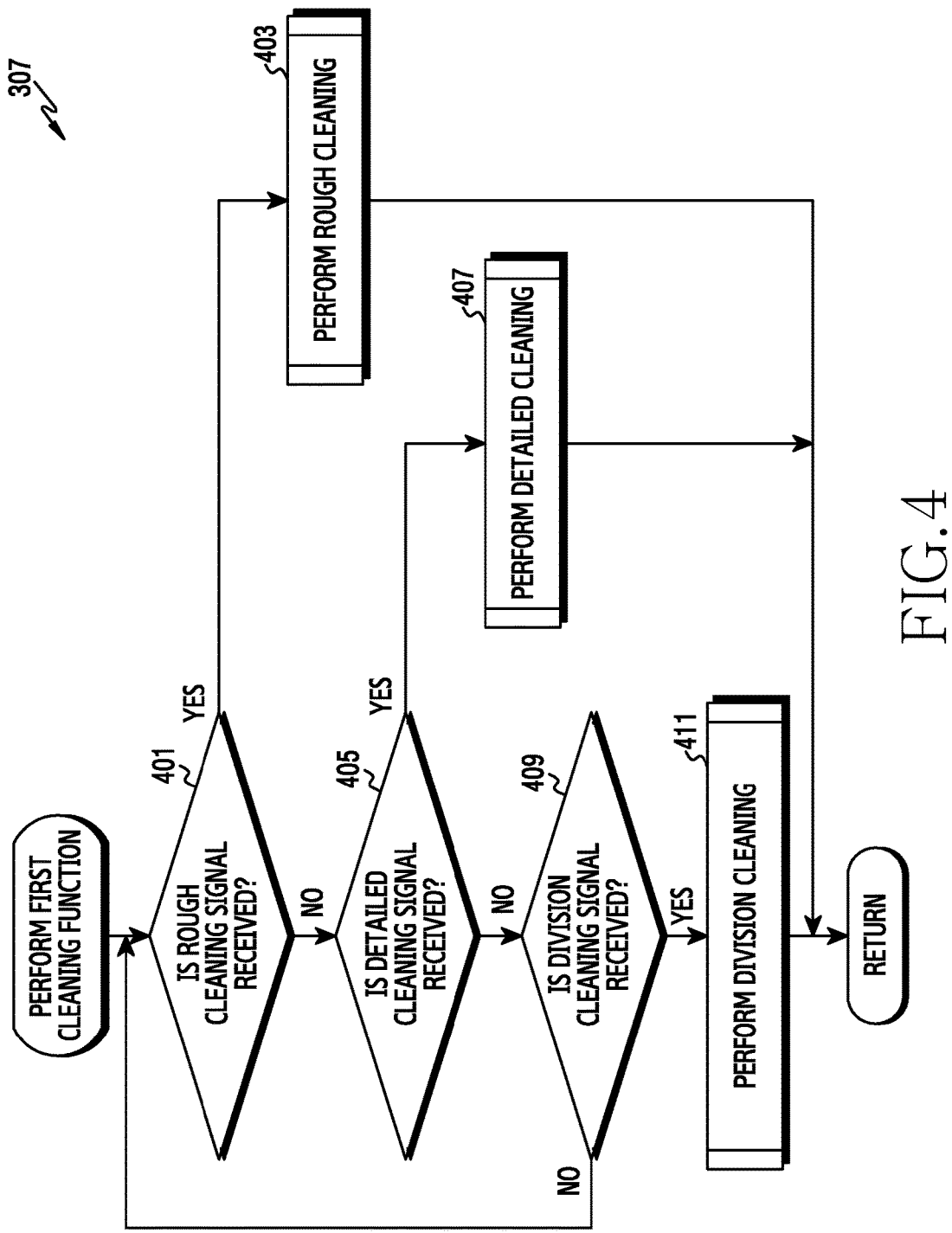
FIG. 4 is a flowchart illustrating an example method for performing a first cleaning function by an electronic device according to an example embodiment of the present disclosure.

FIG. 4 is a flowchart illustrating an example method for performing a first cleaning function by an electronic device according to an example embodiment of the present disclosure. The first cleaning function may include a rough (draft) cleaning function, a detailed cleaning function, and a division cleaning function. When the first cleaning function is performed, the electronic device 200 may recognize that the first external device 300 and the second external device 400 are adjacent to each other. For example, when the first external device 300 is a cleaning device and the second external device 400 is a wearable device, the electronic device 200 may perform the first cleaning function when the user does the cleaning using the cleaning device in a state of having a wearable device in his/her possession.

Referring to FIG. 4, in operation 401, when a signal for performing the rough cleaning is received, the electronic device 200 may proceed to perform operation 403. In operation 403, the electronic device 200 may perform the rough cleaning according to the rough cleaning signal. The operation of the electronic device 200 that performs the rough cleaning will be described in greater detail with reference to FIG. 5. In operation 401, when the signal for performing the rough cleaning is not received, the electronic device 200 may proceed to perform operation 405. In operation 405, when the signal for performing the detailed cleaning is received, the electronic device 200 may proceed to perform operation 407. In operation 407, the electronic device 200 may perform the detailed cleaning according to a detailed cleaning signal. The operation of the electronic device 200 that performs the detailed cleaning will be described in greater detail with reference to FIG. 6.

In operation 405, when the signal for performing the detailed cleaning is not received, the electronic device 200 may proceed to perform operation 409. In operation 409, when the signal for performing the division cleaning is received, the electronic device 200 may proceed to perform operation 411. In operation 411, the electronic device 200 may perform the division cleaning according to a detailed cleaning signal. The operation of the electronic device 200 performing the division cleaning will be described in greater detail with reference to FIG. 7. In operation 409, when the signal for performing the division cleaning is not received, the electronic device 200 may return to operation 401. In this example, the rough cleaning signal, the detailed cleaning signal, and the division cleaning signal may be received from the first external device 300. Although not shown, when a signal for a separate cleaning function is not received from the first external device 300 during a threshold time, the environment-based cleaning function may be deactivated.

Figure 5:
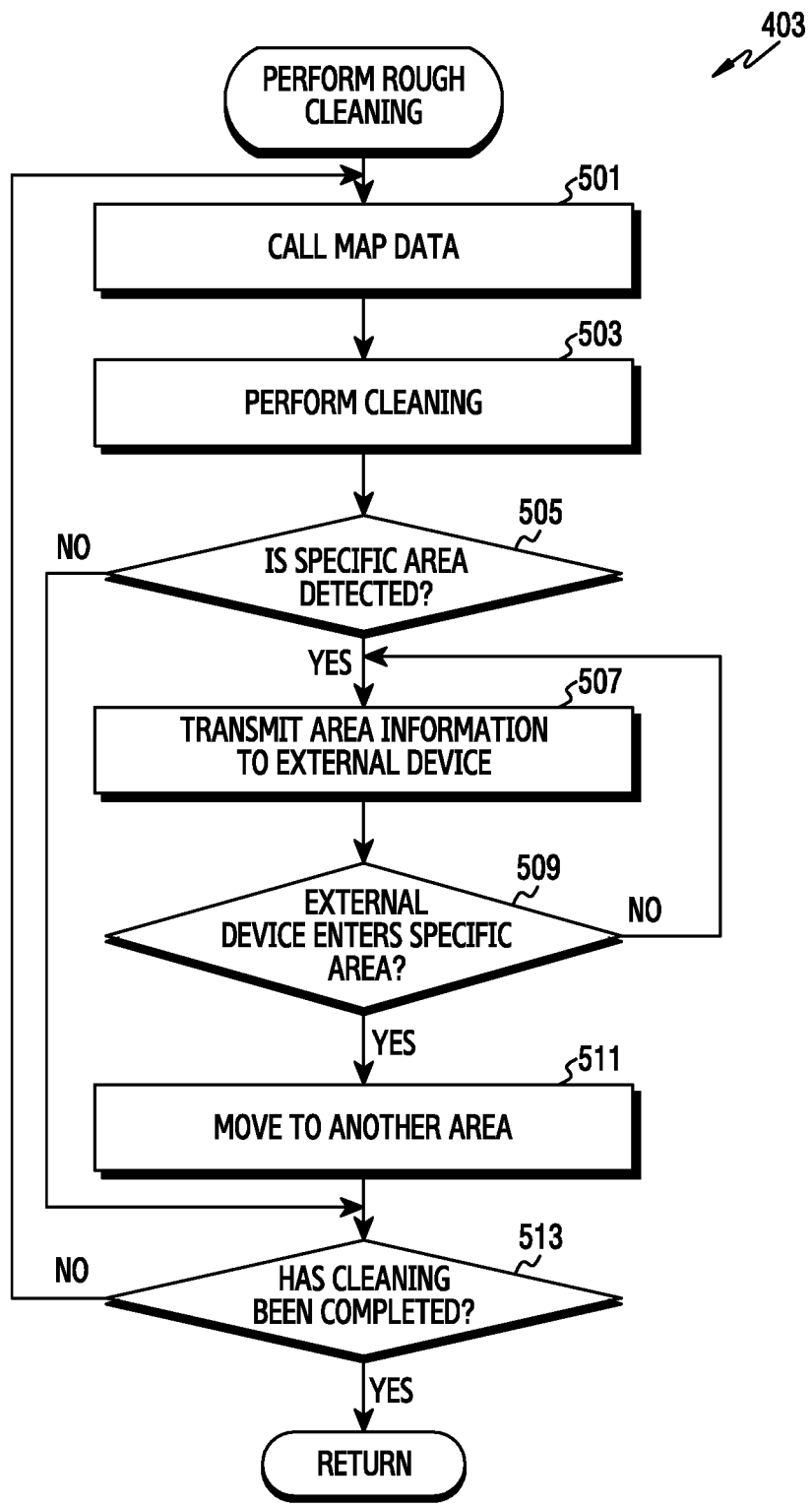
FIG. 5 is a flowchart illustrating an example method for performing rough cleaning by an electronic device according to an example embodiment of the present disclosure.

FIG. 5 is a flowchart illustrating an example method for performing rough cleaning by an electronic device according to an example embodiment of the present disclosure.

Referring to FIG. 5, in operation 501, the electronic device 200 may call, from the memory 270, map data for a space where the electronic device 200 is located. The map data may be a map for a space where the electronic device 200 is to clean. In operation 503, the electronic device 200 may perform cleaning using a specified cleaning function. In this example, a predetermined cleaning function may be set to the rate, number of revolutions, and the like of a normal cleaning function. In operation 505, when a specific area is not detected while performing the cleaning, the electronic device 200 may proceed to perform operation 513. In operation 505, when the specific area is detected while performing the cleaning, the electronic device 200 may proceed to perform operation 507. The specific area may refer to an area where the level of foreign substances is equal to or greater than a reference value or an area where the detailed cleaning is not possible. To this end, the electronic device 200 may collect information for an area being cleaned, using the camera 230, a dust sensor provided in the sensor unit 220, and the like.

In operation 507, the electronic device 200 may transmit area information on the specific area to at least one of the first external device 300 and the second external device 400. In operation 509, when it is detected that one of the first external device 300 and the second external device 400 has entered the specific area, the electronic device 200 may proceed to perform operation 511. For example, the electronic device 200 may detect that one of the first external device 300 and the second external device 400 has entered the specific area, using the camera 230, and sensors such as a proximity sensor, a thermal sensor, etc. provided in the sensor unit 220. In addition, the electronic device 200 may detect that an external device has entered the specific area through wireless communication with one of the first external device 300 and the second external device 400. In operation 509, when it is not detected that an external device has entered the specific area, the electronic device 200 may return to operation 507 to transmit the area information to the external device.

In operation 511, the electronic device 200 may move to another area where the external device does not exist, so as to perform the cleaning. In operation 513, the electronic device 200 may return to operation 315 of FIG. 3 when the cleaning is completed. In operation 513, when the cleaning is not completed, the electronic device 200 may return to operation 503 to perform the above operations again. For example, when the cleaning is complete for all areas in a space where the electronic device 200 is located, the electronic device 200 may determine that the cleaning has been completed. To this end, the electronic device 200 may store a moving path during the cleaning based on the map data. When the cleaning is performed using the rough cleaning function, the electronic device 200 may change the cleaning function based on the sensing information transmitted from the second external device 400. For example, in the middle of performing the first cleaning function, the electronic device 200 may convert the cleaning function into a noise-free function or a pause function based on the sensing information of the second external device 400.

Figure 6:
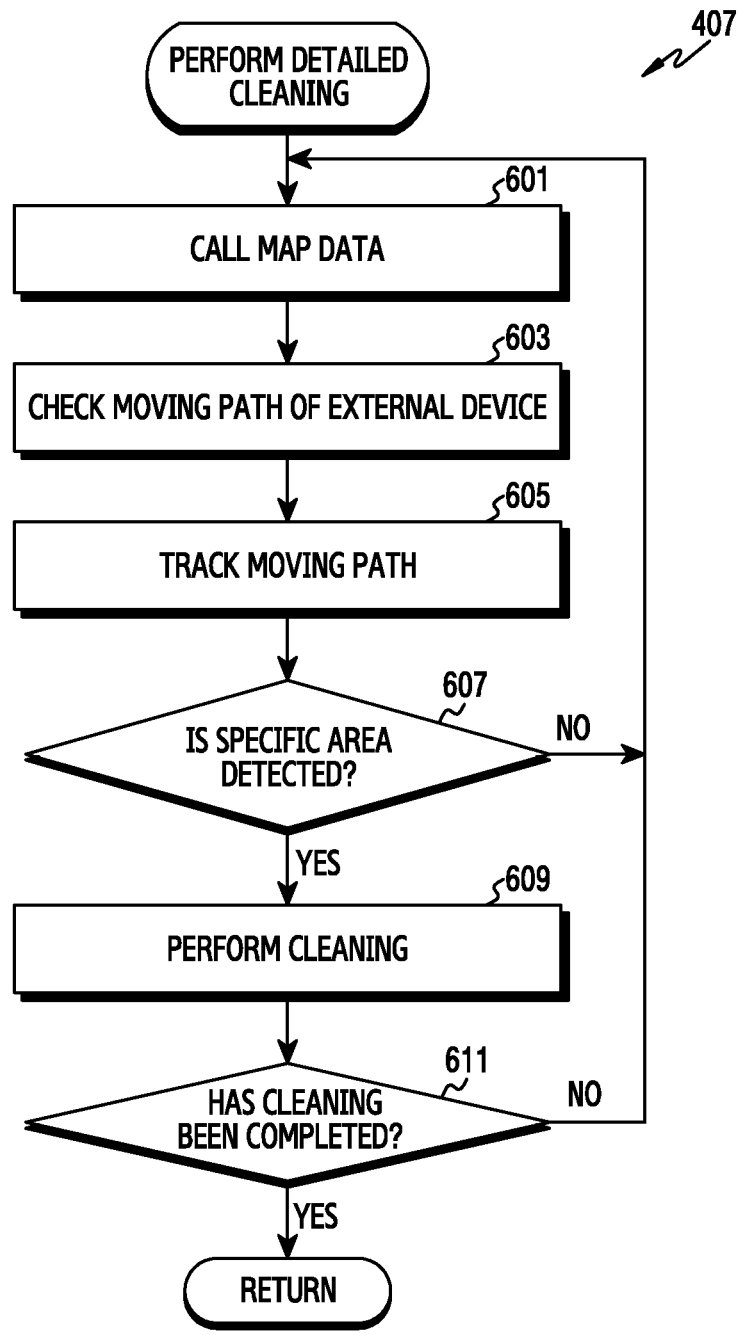
FIG. 6 is a flowchart illustrating an example method for performing detailed cleaning by an electronic device according to an example embodiment of the present disclosure.

FIG. 6 is a flowchart illustrating an example method for performing a detailed cleaning by an electronic device according to an example embodiment of the present disclosure.

Referring to FIG. 6, in operation 601, the electronic device 200 may call, from the memory 270, map data for a space in which the electronic device 200 is located. The map data may be a map for a space where the electronic device 200 is to clean. In operation 603, the electronic device 200 may check a moving path of at least one of the first external device 300 and the second external device 400. To this end, the electronic device 200 may wirelessly communicate with an external device. In operation 605, the electronic device 200 may move along a moving path of the checked external device. In operation 607, when a specific area is detected during the movement along the moving path, the electronic device may proceed to perform operation 609. For example, a specific area may refer to an area where it is checked that the cleaning is not completely performed because the amount of foreign substances is equal to or greater than a reference value. To this end, the electronic device 200 may collect information for an area being cleaned using the camera 230 and a sensor provided in the sensor unit 220. In operation 607 when a specific area is not detected, the electronic device 200 may return to operation 603 to perform the above operations again.

In operation 609, the electronic device 200 may perform cleaning. In operation 611, the electronic device 200 may return to operation 315 of FIG. 3 when the cleaning is completed. In operation 611, when the cleaning is not completed, the electronic device 200 may return to operation 603 to perform the above operations again. For example, when the cleaning is completed for all areas in a space in which the electronic device 200 is located, the electronic device 200 may determine that the cleaning has been completed. To this end, the electronic device 200 may store, based on the map data, moving paths of the external device and electronic device 200 during the cleaning. When the cleaning is performed using the detailed cleaning function, the electronic device 200 may change the cleaning function based on the sensing information transmitted from the second external device 400. For example, in the middle of performing the first cleaning function, the electronic device 200 may convert the cleaning function into a noise-free function or a pause function based on the sensing information of the second external device 400.

Figure 7:
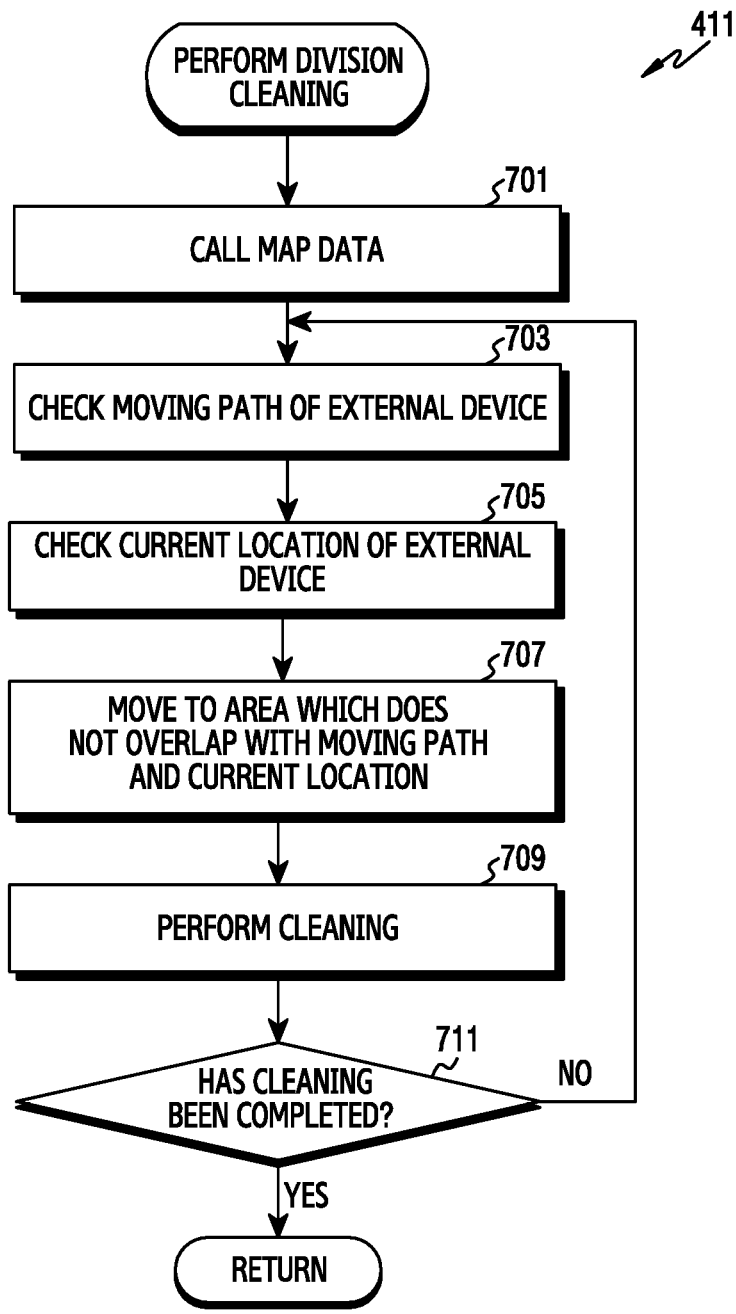
FIG. 7 is a flowchart illustrating an example method for performing division cleaning by an electronic device according to an example embodiment of the present disclosure.

FIG. 7 is a flowchart illustrating an example method for performing division cleaning in an electronic device according to an example embodiment of the present disclosure.

Referring to FIG. 7, in operation 701, the electronic device 200 may call the map data stored in the memory 270. The map data may be a map for a space where the electronic device 200 is to clean. In operation 703, the electronic device 200 may check a moving path of at least one of the first external device 300 and the second external device 400. In operation 705, the electronic device 200 may check a current location of at least one of the first external device 300 and the second external device 400. The operation 703 and operation 705 may operate in reverse order.

In operation 707, the electronic device 200 may check an area where the area does not overlap with the moving path and current location of the external device and move to the checked area. In operation 709, the electronic device 200 may perform cleaning in the area in to which it moved. In operation 711, the electronic device 200 may return to operation 315 of FIG. 3 when the cleaning is completed. In operation 711, when the cleaning is not completed, the electronic device 200 may return to operation 703 to perform the above operations again. For example, when the cleaning is completed for all areas in a space in which the electronic device 200 is located, the electronic device 200 may determine that the cleaning has been completed. To this end, the electronic device 200 may store moving paths of the external device and electronic device 200 during the cleaning. When the cleaning is performed using the division cleaning function, the electronic device 200 may change the cleaning function based on the sensing information transmitted from the second external device 400. For example, in the middle of performing the first cleaning function, the electronic device 200 may convert the cleaning function into a noise-free function or a pause function based on the sensing information of the second external device 400.

Figure 8:
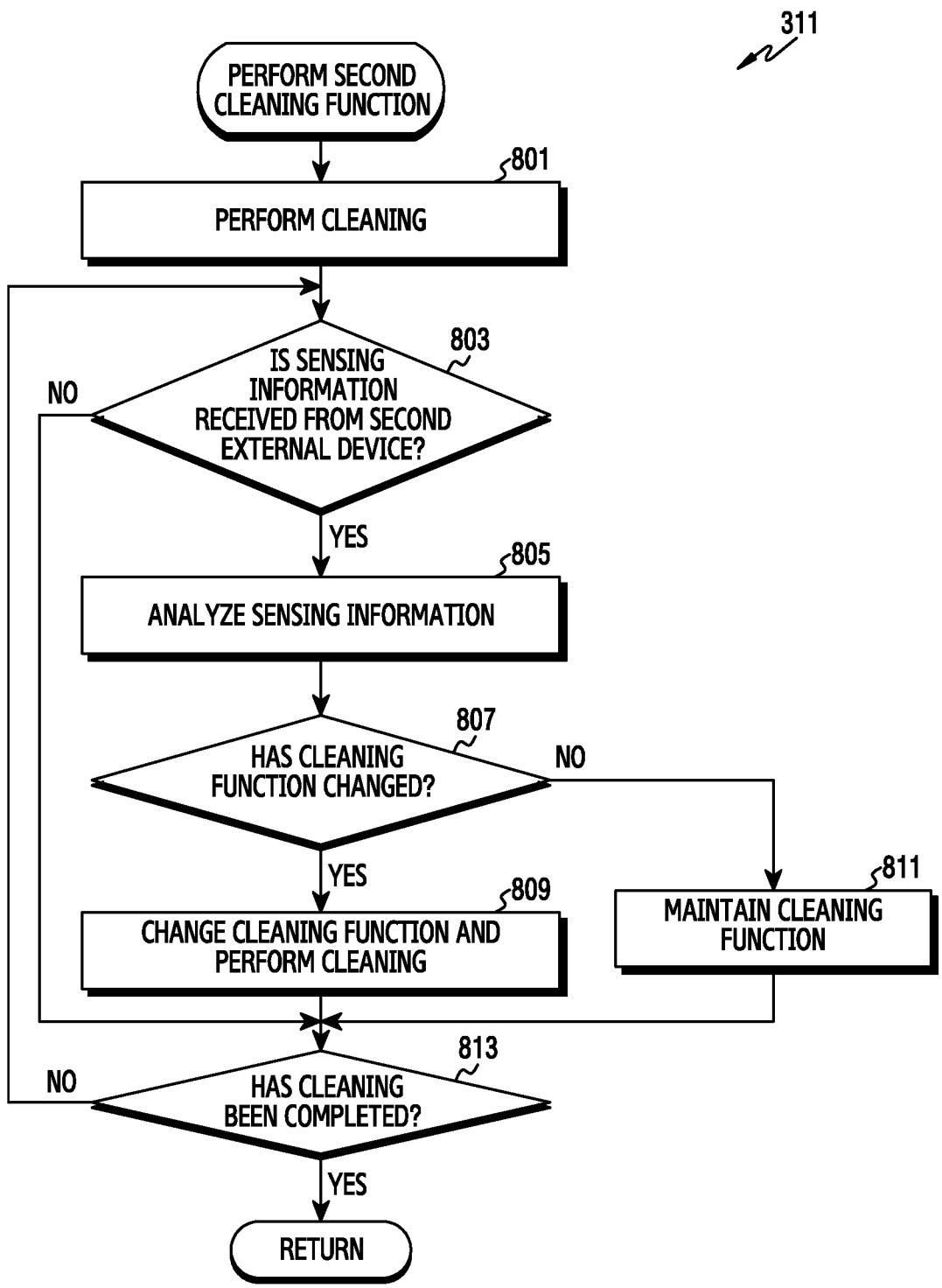
FIG. 8 is a flowchart illustrating an example method for performing a second cleaning function by an electronic device according to an example embodiment of the present disclosure.

FIG. 8 is a flowchart illustrating an example method for performing a second cleaning function by an electronic device according to an example embodiment of the present disclosure.

Referring to FIG. 8, in operation 801, the electronic device 200 may perform cleaning using a specified cleaning function. In this example, the predetermined cleaning function may be set to the rate, number of revolutions, and the like of a normal cleaning function. In operation 803, when sensing information is received from the second external device 400 during the cleaning operation, the electronic device 200 may proceed to perform operation 805. In operation 803, when there is no sensing information received from the second external device 400, the electronic device 200 may proceed to perform operation 813. When it is detected that at least one electronic device plays media data or the second external device 400 is close to the location of a media reproduction device, the second external device 400 may transmit the sensing information for the same to the electronic device 200. When a movement is not detected during a threshold time or a sleep mode is input by the user, the second external device 400 may transmit the sensing information for the same to the electronic device 200. When an incoming call is detected, the second external device 400 may transmit sensing information for the same to the electronic device 200. When the movement is detected, the second external device 400 may check coordinate values and transmit sensing information for the same to the electronic device 400.

In operation 805, the electronic device 200 may analyze the received sensing information, and proceed to perform operation 807. In this example, the sensing information may include sensing information on whether the user is watching or listening to media data, for example, video data, music data, etc., sensing information on whether the user is sleeping, sensing information on whether the user is on the line, and sensing information on a user operation according to whether the user is moving. In operation 807, when, as a result of analyzing the sensing information, it is required to change the cleaning function, the electronic device 200 may proceed to perform operation 809. In operation 809, the electronic device 200 may change the cleaning function and perform cleaning according to the changed function. When the sensing information is related to sensing information on media data watching or listening, sleeping, and phone call, the electronic device 200 may change a normal cleaning function to a noise-free function or a pause function. When the sensing information is related to sensing information on the user movement, the electronic device 200 may change a cleaning function so as to move to an area where the user is not located and perform the cleaning.

In operation 807, when, as a result of analyzing the sensing information, it is not required to change the cleaning function, the electronic device 200 may proceed to perform operation 811. In operation 811, the electronic device 200 may maintain the cleaning function being performed in operation 801 to continuously perform the cleaning.

The electronic device 200 which has performed operation 809 or operation 811 may proceed to perform operation 813. In operation 813, the electronic device 200 may return to operation 315 of FIG. 3 when the cleaning is completed. In operation 813, when the cleaning is not completed, the electronic device 200 may return to operation 803 to perform the above operations again. For example, when the cleaning is completed for all areas in a space where the electronic device 200 is located, the electronic device 200 may determine that the cleaning has been completed. To this end, the electronic device 200 may store a moving path of the electronic device 200 during the cleaning. In addition, the electronic device 200 may determine that cleaning is completed through a signal received from the second external device 400.

Figure 9:
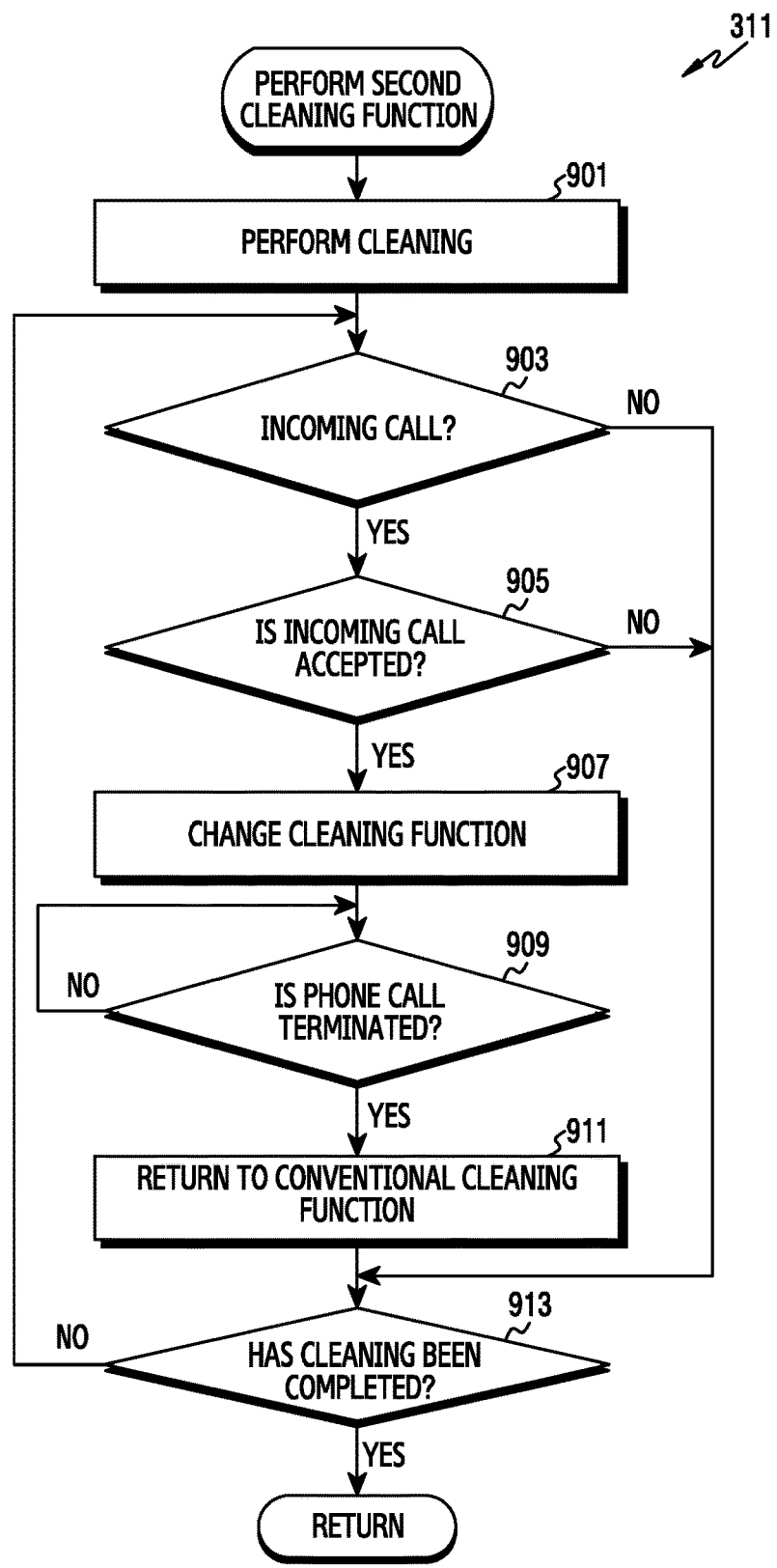
FIG. 9 is a flowchart illustrating an example method for performing a second cleaning function by an electronic device according to another example embodiment of the present disclosure.

FIG. 9 is a flowchart illustrating an example method for performing a second cleaning function by an electronic device according to an example embodiment of the present disclosure.

Referring to FIG. 9, in operation 901, the electronic device 200 may perform cleaning using a specified cleaning function. In this example, the predetermined cleaning function may be set to the rate, number of revolutions, and the like of a normal cleaning function. In operation 903, when, for example, there is an incoming call to the second external device 400 during the cleaning operation, the electronic device 200 may proceed to perform operation 905. The electronic device 200 may check whether there is an incoming call to the second external device 400, using the microphone, etc. provided in the electronic device 200. The electronic device 200 may check whether there is an incoming call, through wireless communication with the second external device 400. In operation 903, the electronic device 200 may proceed to perform operation 913 when there is no incoming call to the second external device 400.

In operation 905, when the second external device 400 accepts the incoming call, the electronic device 200 may proceed to perform operation 907. In operation 905, when the second external device 400 does not accept the incoming call, the electronic device 200 may proceed to perform operation 913. In operation 907, the electronic device 200 may change a normal cleaning function by which the cleaning is being performed into a noise-free function or a pause function. Thus, the electronic device 200 may minimize and/or reduce interference with the user operation. In operation 909, when the second external device 400 terminates a call, the electronic device 200 may proceed to perform operation 911. In operation 909, when the second external device 400 does not terminate a call, the electronic device 200 may maintain the changed cleaning function in operation 907.

In operation 911, the electronic device may return the noise-free function or the pause function to a predetermined cleaning function which has performed the cleaning in operation 901, and may make a control to clean again. In operation 913, when the cleaning is completed, the electronic device 200 may return to operation 315 of FIG. 3. In operation 813, when the cleaning is not completed, the electronic device 200 may return to operation 903 to perform the above operations again. Here, when the cleaning is completed for all areas in a space where the electronic device 200 is located, the electronic device 200 may determine that the cleaning has been completed. To this end, the electronic device 200 may store a moving path of the electronic device 200 during the cleaning. In addition, the electronic device 200 may determine that cleaning is completed, through a signal received from the second external device 400.

Figure 10:
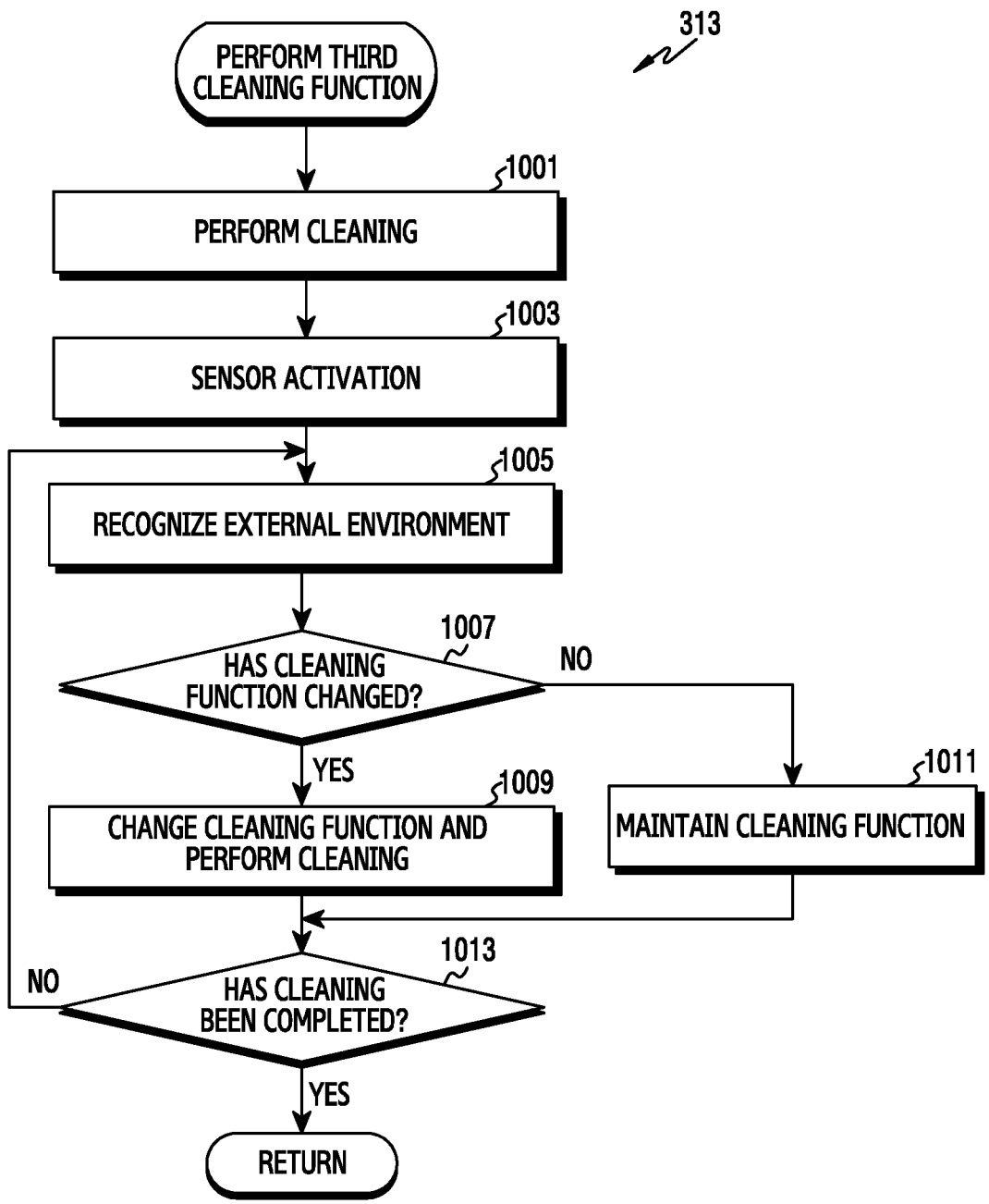
FIG. 10 is a flowchart illustrating an example method for performing a third cleaning function by an electronic device according to an example embodiment of the present disclosure.

FIG. 10 is a flowchart illustrating an example method for performing a third cleaning function by an electronic device according to an example embodiment of the present disclosure.

Referring to FIG. 10, in operation 1001, the electronic device 200 may perform cleaning using a specified cleaning function. In this example, the predetermined cleaning function may be set to the rate, number of revolutions, and the like of a normal cleaning function. In operation 1003, the electronic device 200 may activate at least one sensor included in the sensor unit 220. For example, the sensor may include a microphone for measuring noise on the surrounding environment and the user's voice, a thermal sensor for measuring the user's sleep state and location, a proximity sensor, and the like. The electronic device 200 may activate the camera 230 to determine the user's status.

In operation 1005, the electronic device 200 may recognize the external environment based on the sensing information sensed by the activated sensors. In this example, the sensing information may include sensing information on whether the user is watching or listening to media data, for example, video data, music data, etc., sensing information on whether the user is sleeping, sensing information on whether the user is on the line, and sensing information on whether the user is moving. In operation 1007, when, as a result of analyzing the sensing information, it is required to change the cleaning function, the electronic device 200 may proceed to perform operation 1009. In operation 1009, the electronic device 200 may change cleaning function and perform cleaning according to the changed function. When the sensing information is related to media data watching or listening, sleeping, and phone call, the electronic device 200 may change a normal cleaning function to a noise-free function or a pause function. When the sensing information is related to sensing information on the user movement, the electronic device 200 may change a cleaning function so as to move to an area where the user is not located and perform the cleaning.

In operation 1007, when, as a result of analyzing the sensing information, it is not required to change the cleaning function, the electronic device 200 may proceed to perform operation 1011. In operation 1011, the electronic device 200 may maintain the cleaning function being performed in operation 1001 so as to continuously perform the cleaning. The electronic device 200 which has performed the operation 1009 or the operation 1011 may proceed to perform operation 1013. In operation 1013, the electronic device 200 may return to operation 315 of FIG. 3 when the cleaning is completed. In operation 1013, when the cleaning is not completed, the electronic device 200 may return to operation 1005 to perform the above operations again. Here, when the cleaning is completed for all areas in a space where the electronic device 200 is located, the electronic device 200 may determine that the cleaning has been completed. To this end, the electronic device 200 may store a moving path of the electronic device 200 during the cleaning. In addition, the electronic device 200 may determine that the cleaning is completed, through a signal received from the input unit 260 of the electronic device 200.

An operation method for an electronic device 200 according to an embodiment of the present disclosure may include operations of: checking whether a cleaning function is activated; searching for at least one external device; and performing a cleaning function according to a result of the searching. The operation of performing the cleaning function may include an operation of performing a first cleaning function when the first external device 300 and second external device 400 are detected. The operation of performing the first cleaning function may be an operation of performing one of a rough cleaning function, a detailed cleaning function, and a division cleaning function based on a signal received from the first external device 300. The electronic device 200, the first external device 300, and the second external device 400 may be a wireless cleaning device, a cleaning device, and a wearable device, respectively.

The rough cleaning function may be a function of performing the cleaning; transmitting location information on a specific area which is detected during the cleaning to at least one external device; and moving to another region when at least one external device enters a specific area, and performing the cleaning. The detailed cleaning function may be a function of moving along a moving path of the at least one external device, and performing the cleaning for the specific area when the specific area is detected from the moving path. The divide cleaning function may be a function of checking a location where the location does not overlap with at least one of the moving path and current location of the at least one external device, and moving to the checked location and performing the cleaning.

The operation of performing the cleaning function may include an operation of performing a second cleaning function when the second external device 400 is retrieved. The operation of performing the second cleaning function may further include operations of: performing the cleaning using a predetermined cleaning function; analyzing sensing information received from the second external device 400; checking whether to change a cleaning function according to a result of the analysis; and changing the cleaning function or maintaining the cleaning function according to the analysis result so as to perform the cleaning.

The operation of including at least one sensor and performing the cleaning function may be operations of: activating the sensor when at least one external device is not detected, and setting a cleaning function according to sensing information sensed by the sensor so as to perform the cleaning.

Figure 11C:
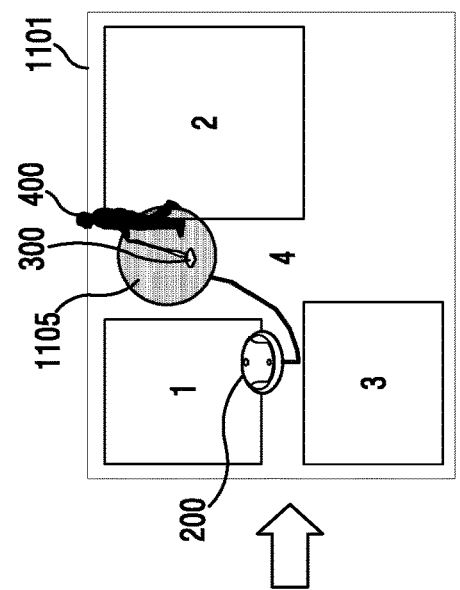
FIGS. 11A, 11B and 11C are diagrams illustrating an example method for performing rough cleaning by an electronic device according to an example embodiment of the present disclosure.
Figure 11B:
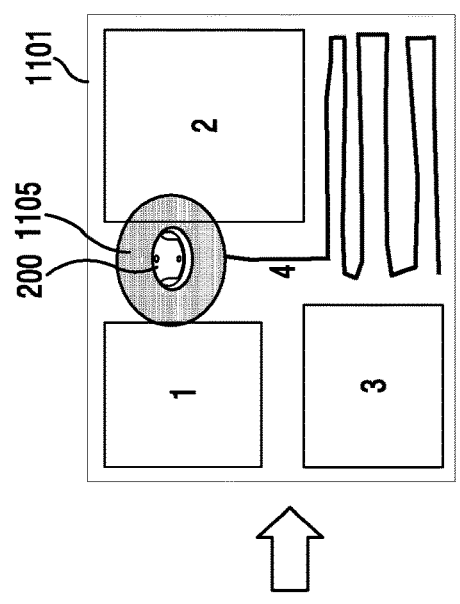
Figure 11A:
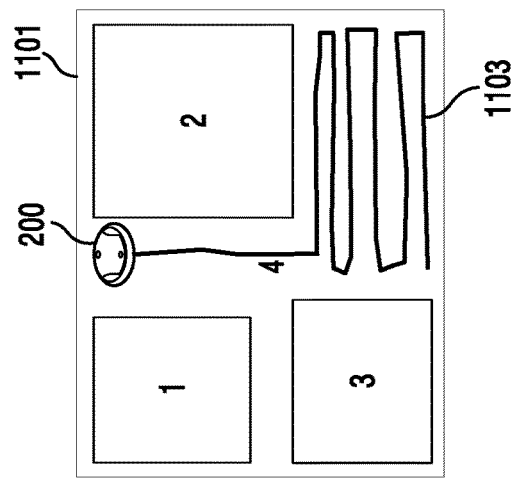

FIGS. 11A, 11B and 11C are diagrams illustrating an example method for performing a rough cleaning function by an electronic device according to an example embodiment of the present disclosure.

Referring to FIGS. 11A, 11B and 11C, when the electronic device 200 is located in a space to be cleaned, as illustrated in FIG. 11A, the electronic device 200 may call map data 1101 for the space. The electronic device 200 may generate map data 1101 for the space through a spatial analysis using image data acquired by the camera 230. When a signal for activating an environment-based cleaning function is received from the input unit 260, the electronic device 200 may search for at least one external device. When both the first external device 300 and the second external device 400 are detected, the electronic device 200 may perform the first cleaning function. When a signal for performing a rough cleaning function from the first external device 300 is received, the electronic device 200 may perform a rough cleaning function.

As illustrated in FIG. 11A, the electronic device 200 may perform the rough cleaning while moving along a moving path 1103 for cleaning within a space corresponding to the map data 1101. The electronic device 200 may detect a specific area 1105, as illustrated in 11B, in the middle of performing the cleaning while moving in the cleaning space. The specific area 1105 may refer to an area where the amount of foreign substances is equal to or more than a threshold value, or an area such as threshold, corners, and the like where the electronic device 200 cannot perform the detailed cleaning. The electronic device 200 may detect the specific area 1105 by using the camera 230 or a dust sensor provided in the sensor unit 220. The electronic device 200 may check location information on the specific area 1105. The controller 200 may transmit the location information on the specific area to at least one of the first external device 300 and the second external device 400. In this case, the location information may include specific coordinate values in the map data 1101.

As illustrated in FIG. 11C, when it is detected that the first external device 300 or the second external device 400 (for example, a wearable electronic device the user is wearing) enters the specific area 1105, the electronic device 200 move to other area in a space to perform the cleaning. At this time, the other area may refer to an area where the area does not overlap with the moving path of the electronic device 200 based on the map data 1101. The electronic device 200 may check that an external device has entered the specific area 1105, through wireless communication with one of the first external device 300 and the second external device 400. The electronic device 200 may check that the external device has entered the specific area 1105, by using the image data acquired by the camera 230. The electronic device 200 may check that the external device has entered the specific area 1105, by using a proximity sensor, a thermal sensor, etc.

FIGS. 12A, 12B and 12C are diagrams illustrating an example method for performing detailed cleaning by an electronic device according to an example embodiment of the present disclosure.

Referring to FIGS. 12A, 12B and 12C, when the electronic device 200 is located in a space to be cleaned, as illustrated in FIG. 12A, the electronic device 200 may call map data 1201 for the space. The electronic device 200 may generate map data 1201 for a space through a spatial analysis using image data acquired by the camera 230. When a signal for activating an environment-based cleaning function is received from the input unit 260, the electronic device 200 may search for at least one external device. When both the first external device 300 and second external device 400 are detected, the electronic device 200 may perform the first cleaning function. When a signal for performing a detailed cleaning function from the first external device 300 is received, the electronic device 200 may perform the detailed cleaning function.

As illustrated in FIG. 12A, the electronic device 200 may communicate with an external device (for example, a first external device and/or a second external device) which moves in a space corresponding to map data 1201. The electronic device 200 may check a moving path 1203 of the external device. The electronic device 200 may track the checked moving path 1203. As illustrated in FIG. 12B, when a specific area 1205 is detected from among the moving path 1203, the electronic device 200 may perform the cleaning for the specific area 1205. The specific region 1205 may refer to an area where foreign substances are detected. The electronic device 200 may detect the specific area 1205 by using the camera 230 or a dust sensor provided in the sensor unit 220. As illustrated in FIG. 12C, when the cleaning for the specific area 1205 is completed, the electronic device 200 may continuously track the moving path of the external electronic device.

According to various embodiments, the electronic device 200 may move while performing a cleaning function along the moving path 1203 of the external device. According to an embodiment, when the specific area 1205 is detected by the electronic device 200 while performing a cleaning function moving along the moving path 1203 of the external device, the electronic device 200 may perform a more detailed cleaning function.

FIGS. 13A, 13B and 13C are diagrams illustrating an example method for performing a division cleaning function by an electronic device according to an example embodiment of the present disclosure.

Referring to FIGS. 13A, 13B and 13C, when the electronic device 200 is located in a space to be cleaned, as illustrated in FIG. 13A, the electronic device 200 may call map data 1301 for the space. The electronic device 200 may generate map data 1301 for a space through a spatial analysis using image data acquired by the camera 230. When a signal for activating an environment-based cleaning function is received from the input unit 260, the electronic device 200 may search for at least one external device. When both the first external device 300 and second external device 400 are detected, the electronic device 200 may perform the first cleaning function. When a signal for performing a division cleaning function from the first external device 300 is received, the electronic device 200 may perform a division cleaning function.

The electronic device 200 may perform the division cleaning while moving in a space corresponding to map data 1301, as illustrated in FIG. 13A. When it is determined that the current location of the external device is a first region 1, the electronic device 200 may clean one region, that is, a fourth region 4, from among remaining areas 2, 3, and 4 other than the first region 1. To this end, the electronic device 200 may wirelessly communicate with an external device.

When the cleaning in the fourth region 4 is completed, the electronic device 200 may check a moving path of the external device based on a signal received from the external device. As illustrated in FIG. 13B, the electronic device 200 may check that the external device moves from the first region 1 to the third region 3. The electronic device 200 may move to the second region 2 where the cleaning is not completed, from among areas (the second region 2 and fourth region 4) other than the first region 1 which is the moving path of the external device and the third region 3 which is the current location thereof. The electronic device 200 may perform the cleaning of the second region 2. As described above, the external device and electronic device 200 may complete the cleaning by dividing the cleaning region thereof as illustrated in FIG. 13C.

Figure 14C:
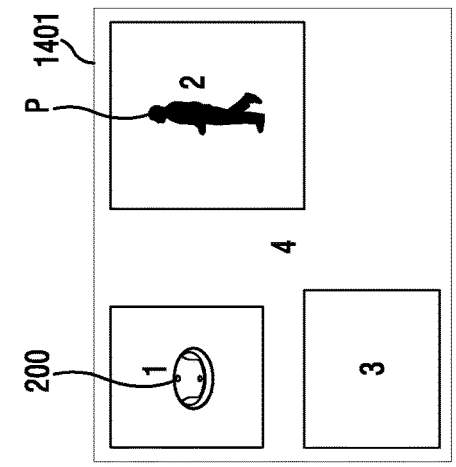
FIGS. 14A, 14B and 14C are diagrams illustrating an example method for performing a third cleaning function by an electronic device according to an example embodiment of the present disclosure.
Figure 14B:
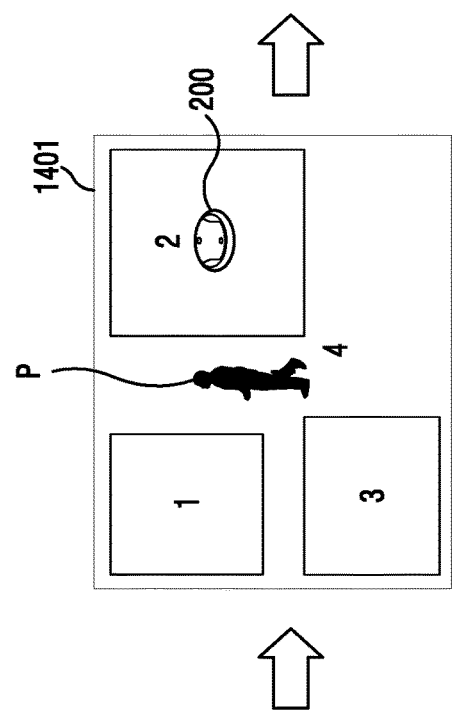
Figure 14A:
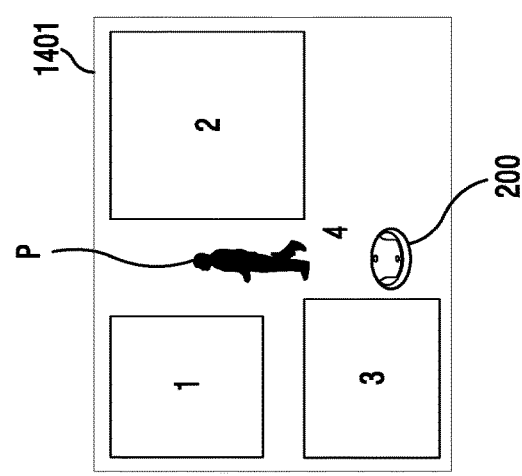

FIGS. 14A, 14B and 14C are diagrams illustrating an example method for performing a third cleaning function by an electronic device according to an example embodiment of the present disclosure.

Referring to FIGS. 14A, 14B and 14C, when the electronic device 200 is located in a space to be cleaned, as illustrated in FIG. 14A, the electronic device 200 may call map data 1401 for the area. The electronic device 200 may generate map data 1401 for a space through a spatial analysis using image data acquired by the camera 230. When a signal for activating an environment-based cleaning function is received from the input unit 260, the electronic device 200 may search for at least one external device. When neither of the first external device 300 and second external device 400 is detected, the electronic device 200 may perform the third cleaning function. The electronic device 200 may perform the third cleaning function by activating sensors, provided in the electronic device 200.

The electronic device 200 may perform the cleaning while moving in a space corresponding to map data 1401, as illustrated in FIG. 14A. The electronic device 200 may detect that the user P is located in the fourth region 4 by a sensor provided in the electronic device 200, as illustrated in FIG. 14A. The electronic device 200 may check that the user P is located in the fourth region 4 by analyzing the image data acquired by the camera 230. The electronic device 200 may check the user's location, using a sensor such as a thermal sensor, and the like. When it is checked that the user P is located in the fourth region 4, the electronic device 200 may move to a region where the user P is not located, for example, the second region 2, as illustrated in FIG. 14B. The electronic device 200 may perform the cleaning in the second region 2. When the cleaning in the second region 2 is completed, the electronic device 200 may check an area where the user P is not located, from among other regions, for example, the first region 1, the third region 3, and the fourth region 4.

When it is checked that the user P is located in the second region 2, as illustrated in FIG. 14C, the electronic device 200 may move to one of the first region 1, third region 3, and fourth region 4, for example, to the first region 1. The electronic device 200 may perform the cleaning in the first region 1.

As described above, an electronic device and operating method thereof of the present disclosure can check a cleaning environment, by interworking with an external device, perform the cleaning optimized with the checked cleaning environment, so as to improve cleaning efficiency.

Meanwhile, various example embodiments of the present disclosure illustrated and described in this description and the drawings correspond to various examples presented in order to easily explain technical contents of the present disclosure, and to aid in understanding of the present disclosure, but are not intended to limit the scope of the present disclosure. It will be understood by those skilled in the art to which the present disclosure belongs that different modifications can be achieved based on the technical spirit of the present disclosure.

What is claimed is:

1. A method for operating an electronic device, the method comprising:
   determining whether a cleaning function is activated;
   searching for at least one external device including at least one of a first external device or a second external device; and
   performing a cleaning function based on a result of the searching, wherein performing the cleaning function comprises performing a first cleaning function,
   wherein performing the first cleaning function comprises:
      detecting a specific area where an amount of foreign substances is equal to or greater than a reference amount while the cleaning function is performed;
      transmitting, to the at least one external device, location information on the specific area detected; and
      moving to another area when the at least one external device enters the specific area.

2. The method of claim 1, the first cleaning function is performed when the first external device and the second external device are detected.

3. The method of claim 1, wherein performing the cleaning function further comprises performing a second cleaning function, wherein performing the second cleaning function comprises:
   moving along a moving path of the at least one external device; and
   performing a cleaning function for a specific area when the specific area is detected from the moving path.

4. The method of claim 1, wherein performing the cleaning unction further comprises performing a third cleaning function, wherein performing the third cleaning function comprises:
   determining a location that does not overlap with at least one of a moving path and current location of the at least one external device; and
   moving to the determined location and performing a cleaning function.

5. The method of claim 1, wherein performing the cleaning function further comprises performing a fourth cleaning function, wherein performing the fourth cleaning function comprises:
   performing a predetermined cleaning function;
   analyzing sensing information received from the second external device;
   determining whether to change a cleaning function based on a result of the analyzing; and
   changing the predetermined cleaning function or maintaining the predetermined cleaning function based on the determination.

6. The method of claim 1, wherein performing the cleaning function further comprises:
   activating at least one sensor provided in the electronic device when the at least one external device is not detected; and
   setting a cleaning function based on sensing information sensed by at least one sensor.

7. The method of claim 1, wherein the electronic device, the first external device, and the second external device comprise a wireless cleaning device, a cleaning device, and a wearable device, respectively.

8. An electronic device comprising:
   a communication circuitry configured to communicate with at least one external device; and
   a controller configured to:
      determine whether a cleaning function is activated,
      search for the at least one external device including at least one of a first external device or a second external device,
      cause to be performed a cleaning function based on a result of the searching;
      detect a specific area where an amount of foreign substances is equal to or greater than a reference amount while the cleaning function is performed;
      transmit, to the at least one external device, location information on the specific area detected; and
      move the electronic device to another area when the at least one external device enters the specific area.

9. The electronic device of claim 8, wherein the controller is configured to perform the cleaning function when the first external device and the second external device are detected.

10. The electronic device of claim 8, wherein the controller is further configured to:
    move the electronic device along a moving path of the at least one external device, and
    performing a cleaning function for the specific area when the specific area is detected from the moving path.

11. The electronic device of claim 8, wherein the controller is further configured to:

determine a location that does not overlap with at least one of a moving path and current location of the at least one external device; and move the electronic device to the determined location and performing a cleaning function.

12. The electronic device of claim 8, wherein the controller is further configured to:

cause to be performed a predetermined cleaning function, analyze sensing information received from the second external device;

determine whether to change a cleaning function based on a result of the analyzing, and change the predetermined cleaning function or maintain the predetermined cleaning function based on the determination.

13. The electronic device of claim 8, further comprising at least one sensor, and wherein the controller is further configured to:

activate the at least one sensor when the at least one external device is not detected, and set a cleaning function based on sensing information sensed by the at least one sensor.

14. The electronic device of claim 8, wherein the first external device and the second external device comprise a cleaning device and a wearable device, respectively, and the electronic device comprises a wireless cleaning device.

* * * * *